United States Patent
Kim et al.

(10) Patent No.: US 6,714,253 B2
(45) Date of Patent: Mar. 30, 2004

(54) METHOD OF DISPLAYING DIGITAL BROADCASTING SIGNALS THROUGH A DIGITAL BROADCASTING RECEIVER AND A DISPLAY DEVICE

(75) Inventors: Eun Joo Kim, Seoul (KR); Choon Lee, Seoul (KR); Teag Il Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 09/799,077

(22) Filed: Mar. 6, 2001

(65) Prior Publication Data

US 2001/0019365 A1 Sep. 6, 2001

(30) Foreign Application Priority Data

Mar. 6, 2000  (KR) ......................................... 2000-11078

(51) Int. Cl.[7] ................................................. H04N 5/46
(52) U.S. Cl. ...................................... 348/556; 348/554
(58) Field of Search .............................. 348/554–558, 348/445, 734, 441, 553; 725/38

(56) References Cited

U.S. PATENT DOCUMENTS

| | | | | |
|---|---|---|---|---|
| 6,034,732 A | * | 3/2000 | Hirota et al. | 348/441 |
| 6,124,893 A | * | 9/2000 | Stapleton | 348/441 |
| 6,137,539 A | * | 10/2000 | Lownes | 348/569 |
| 6,337,716 B1 | * | 1/2002 | Yim | 348/554 |
| 6,525,777 B2 | * | 2/2003 | Kameda et al. | 348/555 |
| 6,549,243 B1 | * | 4/2003 | Takashimizu | 348/558 |

* cited by examiner

Primary Examiner—Victor R. Kostak
(74) Attorney, Agent, or Firm—Birch, Stewart, Kolasch & Birch, LLP

(57) ABSTRACT

A method of displaying a digital broadcasting signal using a digital broadcasting receiver and a digital display device is disclosed. In the present invention, information on a display mode of the display device is communicated to the digital broadcasting receiver through a bi-directional communication line. As a result, the digital broadcasting receiver can process the input digital broadcasting signal according to the display mode. Thus, the digital broadcasting signal can be displayed in an optimum display mode through the digital display device. Accordingly, the received digital broadcasting signal can be displayed in diverse formats and in an optimum condition.

19 Claims, 12 Drawing Sheets

FIG.2
related art

| display mode / conversion / input signal | standard definition 4:3 | | standard definition 16:9 | | standard definition 4:3 | | high definition 16:9 | |
|---|---|---|---|---|---|---|---|---|
| | format change | aspect ratio change | format change | aspect ratio change | format change | aspect ratio change | format change | aspect ratio change |
| 1920×1080 high definition 16:9 | Down Conversion | PAN/SCAN Letter Box | Down Conversion | No | No | No | No | No |
| 704×480 standard definition 16:9 | No | PAN/SCAN Letter Box | No | No | Up Conversion | No | Up Conversion | No |
| 704×480 standard definition 4:3 | No | No | No | Crop, Wide,... Zoom | Up Conversion | No | Up Conversion | Crop, Wide,... Zoom |
| 1024×768 XGA 4:3 | Down Conversion | No | Down Conversion | Crop, Wide,... Zoom | No | No | No | Crop, Wide,... Zoom |

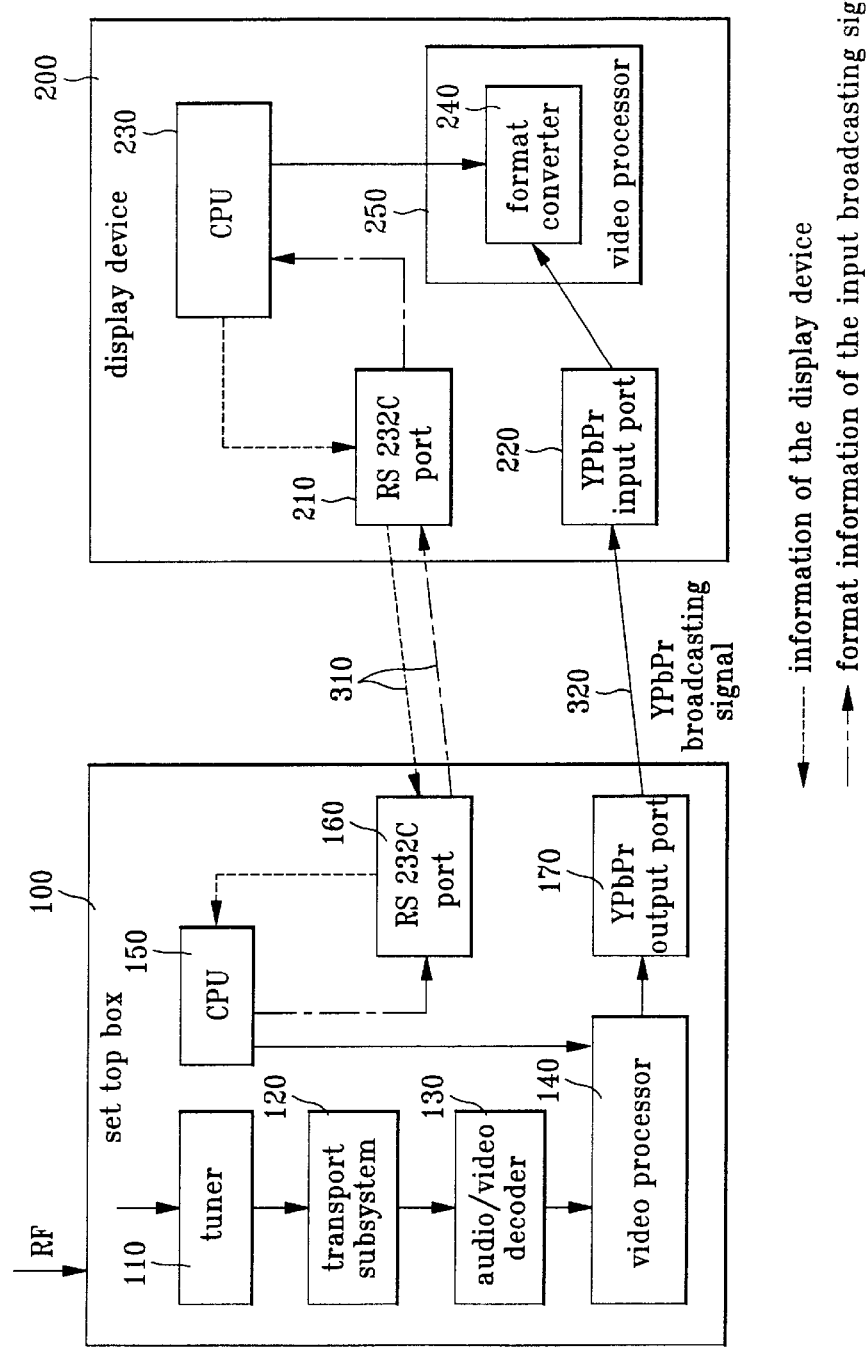

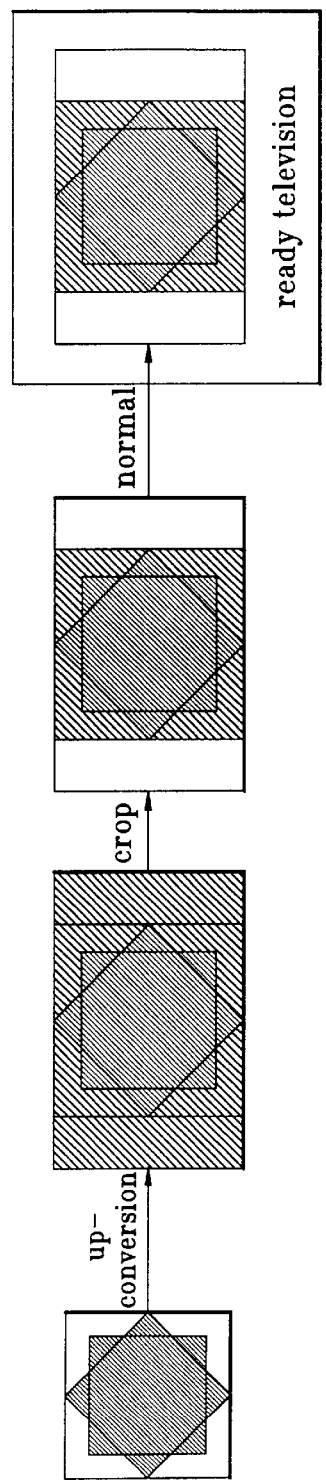

FIG.8

| output of set top box (input to ready television) | | | display mode of ready television | | |
|---|---|---|---|---|---|
| resolution | aspect ratio | aspect ratio change information | resolution | aspect ratio | aspect ratio change information |
| SD | 4:3 | No | SD | 4:3 | Normal |
| | 16:9 | PAN/SCAN | | | Normal |
| | | Letter Box | | | Normal |
| | 4:3 | Crop | | 16:9 | Normal |
| | | Wide | | | Wide |
| | | Spectacle | | | Spectacle |
| | | Zoom1 | | | Wide,crop,Normal |
| | | Zoom2 | | | Wide,crop,Normal |
| | | NO | | | Dependent on ready TV setting |
| | 16:9 | NO | | | Normal |
| HD | 4:3 | NO | HD | 4:3 | Dependent on ready TV setting (Mode A,B,C) |
| | 16:9 | NO | | | Dependent on ready TV setting (Mode A,B,C) |
| | 4:3 | Crop | | 16:9 | Normal |
| | | Wide | | | Wide |
| | | Spectacle | | | Spectacle |
| | | ZOOM1 | | | Wide,Crop,Normal |
| | | ZOOM2 | | | Wide,Crop,Normal |
| | | NO | | | Dependent on ready TV setting |
| | 16:9 | NO | | | Normal |

METHOD OF DISPLAYING DIGITAL BROADCASTING SIGNALS THROUGH A DIGITAL BROADCASTING RECEIVER AND A DISPLAY DEVICE

BACKGROUND OF THE INVENTION

1. Field of the Invention

The present invention relates to a digital receiver and more particularly, to a method of displaying broadcasting signals using a digital broadcasting receiver and a digital display device.

2. Description of the Related Art

There are many differences between digital broadcasting and analog broadcasting. One difference is that the digital broadcasting can support a more diverse video formats in comparison to the analog broadcasting. The diverse video formats of the digital broadcasting includes formats such as by definition, namely high definition (HD) or standard definition (SD), and by the aspect ratio, namely 16:9 or 4:3. Thus, the digital broadcasting has allows better video services users by supporting diverse video formats.

To provide the diverse video formats of the digital broadcasting, a digital broadcasting receiver such as a set top box and a display device such as a ready television receiver are required to receive and display video signals. Particularly, a digital broadcasting receiver receives digital broadcasting signals from an external source and generates an analog broadcasting signal by decoding the digital broadcasting signal. The digital broadcasting receiver then transmits to the display device the analog broadcasting signal divided into video, audio, and information data. Here, the set top box may receive both analog broadcasting signals as well as digital broadcasting signals. Also, the ready television receiver, which is in essence a type of a monitor, may have different display modes.

FIG. 1 shows examples of video signals displayed in different modes using the digital broadcasting receiver and the display device.

FIG. 2 is a table showing the display modes of a display device in accordance with the type of a broadcasting signal transmitted from a digital broadcasting receiver. As shown, both a digital broadcasting receiver and a display device can diversely convert the format of the digital broadcasting signal received from an external source and provide the diverse video formats to users.

However, a display device in the related art as described above can support a limited number of display modes depending upon the manufacturer and model of the display device. Also, a display device and a digital broadcasting receiver are separate devices, connected only by a video signal transmission line. Thus, the display device cannot immediately recognize the format of the broadcasting signal input from the digital broadcasting receiver. As a result, the display device may distort and display the input digital broadcasting signal.

Namely, if a broadcasting signal with a format that is not supported by a display device is transmitted from a digital broadcasting receiver, the display device such as the ready television receiver may display the broadcasting signal with loss. Moreover, if a new broadcasting signal is input to the digital broadcasting receiver, the format of the input broadcasting signal may be converted to a format corresponding to a display mode previously set by a user. In such case, the new broadcasting signal cannot be displayed in the format currently desired by the user.

For example, if a high definition broadcasting signal with an aspect ratio of 16:9 is input to a digital broadcasting receiver and is displayed through a display device set to a high definition display mode with an aspect ratio of 4:3, the broadcasting signal would be displayed with losses to the sides of the image as in Mode A of FIG. 1. Furthermore, if on-screen display characters are mixed with the broadcasting signal and the display mode of the display device is set to Mode A of FIG. 1, the on-screen display characters would also be lost and thus, the user would not be able to see the on-screen display characters on the screen.

SUMMARY OF THE INVENTION

Accordingly, an object of the present invention is to solve at least the problems and disadvantages of the related art.

An object of the present invention is to provide a more efficient display of broadcasting signals of different formats.

Another object of the present invention is to provide a more efficient method of displaying a digital broadcasting signal using a digital broadcasting receiver and a digital display device.

A further object of the present invention is to provide a method of displaying a digital broadcasting signal using a digital broadcasting receiver and a digital display device, which enables broadcasting signals received through the digital broadcasting receiver to be displayed in an optimum display mode through the digital display device in accordance with the broadcasting signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a digital display device receives information on a currently input digital broadcasting signal before displaying the input signal, searches and determines an optimum mode among the display modes of the display device using the information, and displays the input signal in the optimum mode.

In one embodiment of the present invention, a method of displaying a digital broadcasting signal using a digital broadcasting receiver and a digital display device comprises performing a communication for transmitting information on a display mode at least in one direction between the digital broadcasting receiver and the digital display device; the display device searching and determining an optimum display mode using the information on the display mode; and displaying the broadcasting signal received through the digital broadcasting receiver in the determined optimum display mode through the display device.

In another embodiment of the present invention, a method of displaying a digital broadcasting signal using a digital broadcasting receiver and a digital display enables a bi-directional communication between the digital broadcasting receiver and the display device through a bi-directional communication line. The method comprises of the display device sending to the digital broadcasting receiver information on a current display mode of the display device such as an aspect ratio (e.g. aspect ratio of 16:9 or 4:3), resolution (e.g. high definition or standard definition), and scanning type (e.g. interlace or progressive); the digital broadcasting receiver processing the received broadcasting signal using the information on the display mode and sending the processed broadcasting signal and its information to the display device; and the display device determining its own display mode suitable for the processed broadcasting signal through a lookup table using the information of the processed broadcasting signal.

In still another embodiment of the present invention, a method of displaying a digital broadcasting signal using a digital broadcasting receiver and a digital display enables the digital broadcasting receiver sending information of the received broadcasting signal to the display device, i.e. an uni-directional communication. The method comprises of the digital broadcasting receiver inserting information on the received broadcasting signal such as an aspect ratio, resolution, scanning type, and aspect ratio change information into vertical blanking periods of the received broadcasting signal and sending the information to the display device along with the received broadcasting signal; the display device determining an optimum display mode on a lookup table using the information; and the display device displaying the received broadcasting signal in the determined optimum display mode.

BRIEF DESCRIPTION OF THE DRAWINGS

The invention will be described in detail with reference to the following drawings in which like reference numerals refer to like elements wherein:

FIG. 2 is a table of display modes available in a display device based upon the type of broadcasting signals transmitted from a digital broadcasting receiver;

FIG. 3 is a block diagram showing a bi-directional communication line provided between a digital broadcasting receiver and a digital display according to the present invention;

FIG. 7 shows the process of converting a format of a broadcasting signal when bi-directional communication is performed between a digital broadcasting receiver and a digital display device according to the present invention;

FIG. 8 is a table of broadcasting signals output from a digital broadcasting receiver and optimal display modes of a display device corresponding to the broadcasting signals according to the present invention;

DETAILED DESCRIPTION OF THE PREFERRED EMBODIMENTS

Figure 1:
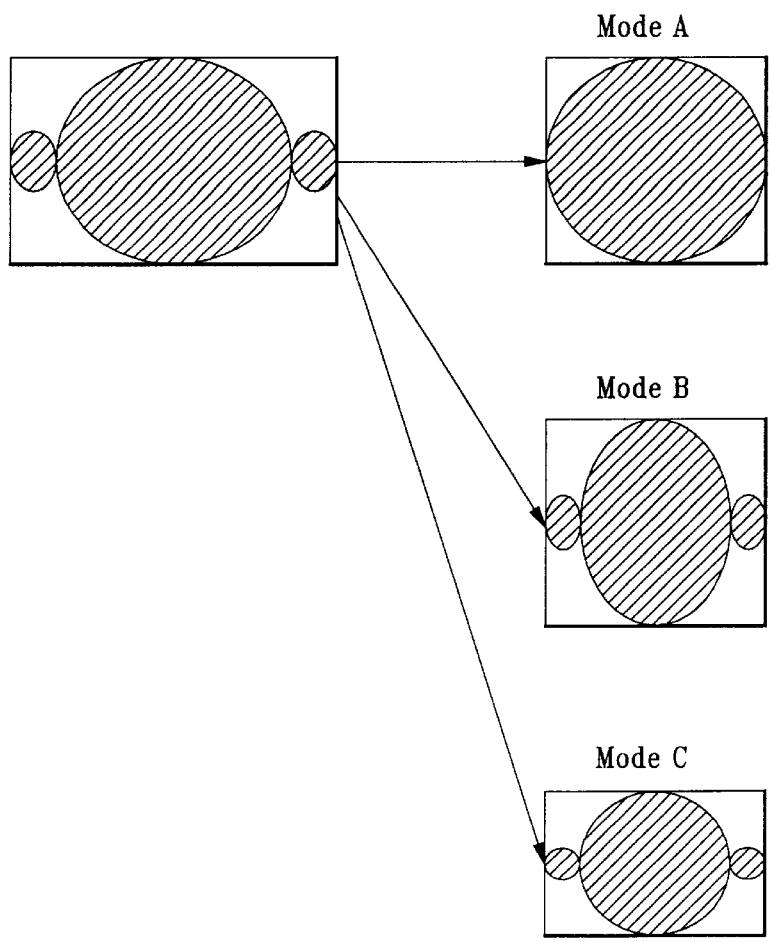
FIG. 1 shows examples video signals displayed in different modes using a digital broadcasting receiver and a display device.

Reference will now be made in detail to the preferred embodiments of the present invention, examples of which are illustrated in the accompanying drawings.

FIG. 3 is a block diagram when a bi-directional communication line is provided between a digital broadcasting receiver and a display according to the present invention. In FIG. 3, a set top box (STP) is used as the digital broadcasting receiver and a typical RSC323C may be used as the bi-directional communication line.

Referring to FIG. 3, a STP 100 comprises a tuner 110 which tunes a digital radio frequency (RF) signal from an external source; a transport subsystem 120; an audio/video decoder 130; a video processor 140; a central processing unit (CPU) 150; an RS232C port 160; and a YPbPr output port 170 which outputs a YPbPr signal, i.e. the analog broadcasting signal. The display device 200 comprises an RS232C port 210; a YPbPr input port 220; a CPU 230; and a video processor 250 including a format converter 240.

The important elements in the above described devices are the RS232C port 160 of the STP 100 and the RS232C port 210 of the display device 200 which are connected by the bi-directional communication line 310. In the preferred embodiment of the present invention, RS232C is used as the bi-directional communication line. Also, a uni-directional transmission line 320 connects the STP 100 and the display device 200 to transmit the decoded broadcasting signals from the STP 100 to the display device 200 for display.

Figure 4:
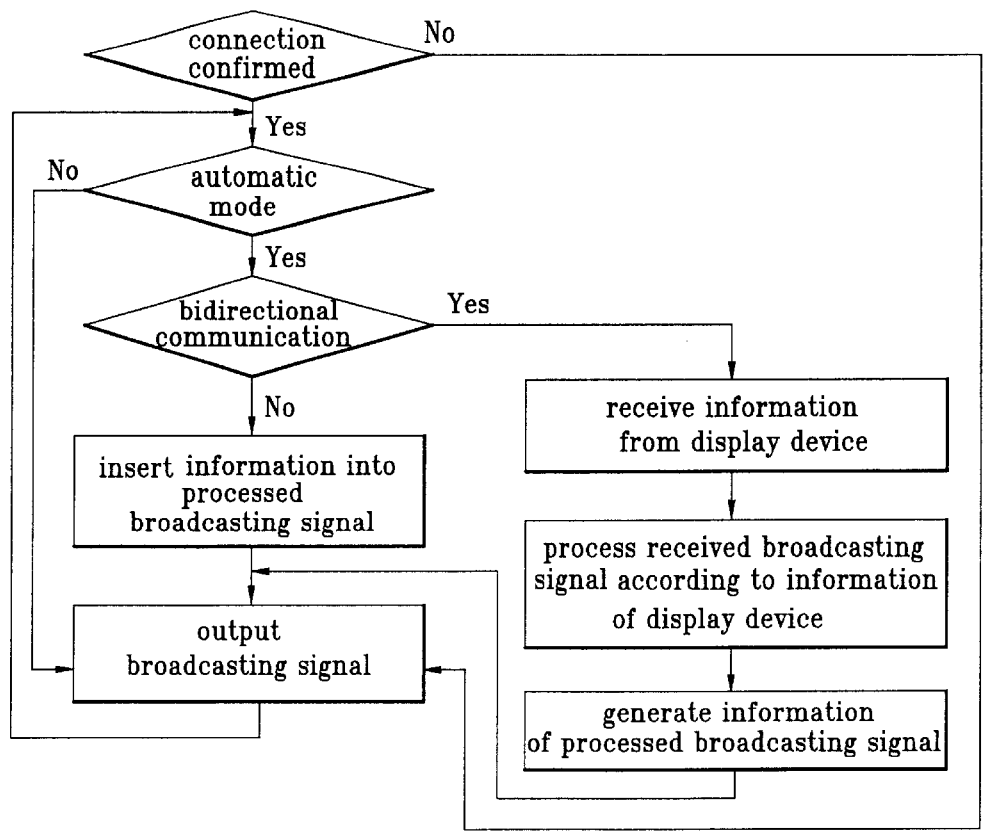
FIG. 4 is a flowchart of a digital broadcasting receiver operations according to the present invention.

FIG. 4 is a flowchart showing the operations of the STP 100. First, the STP 100 confirms whether it is connected to the display device 200. If connected, the STP 100 checks whether its mode is set to an automatic mode. If the STP 100 is not connected to the display device 200 and/or the mode is not in the automatic mode, the STP 100 outputs the broadcasting signal, received from an external source and processed for display, to the display device 200. On the other hand, if the STP 100 is connected to the display device 200 and the mode is in the automatic mode, the STP 100 checks whether the communication path to the display device 200 is bi-directional through the bi-directional communication line 310 or uni-directional through the transmission line 320.

If the communication path is uni-directional, the STP 100 inserts information of the analog broadcasting signal among the scanning lines of the analog broadcasting signal for display and outputs the analog broadcasting signal to the display device 200. Here, the inserted information is a type of control data. If the communication path is bi-directional, the STP 100 receives from the display device 200 information on the current display mode of the display device 200 through the bi-directional communication line 310. The STP 100 then processes the broadcasting signal received from the external source in accordance with the received display mode, and generates information on the processed broadcasting signal. Thereafter, the STP 100 transmits the processed broadcasting signal and its information to the display device 200.

Figure 5:
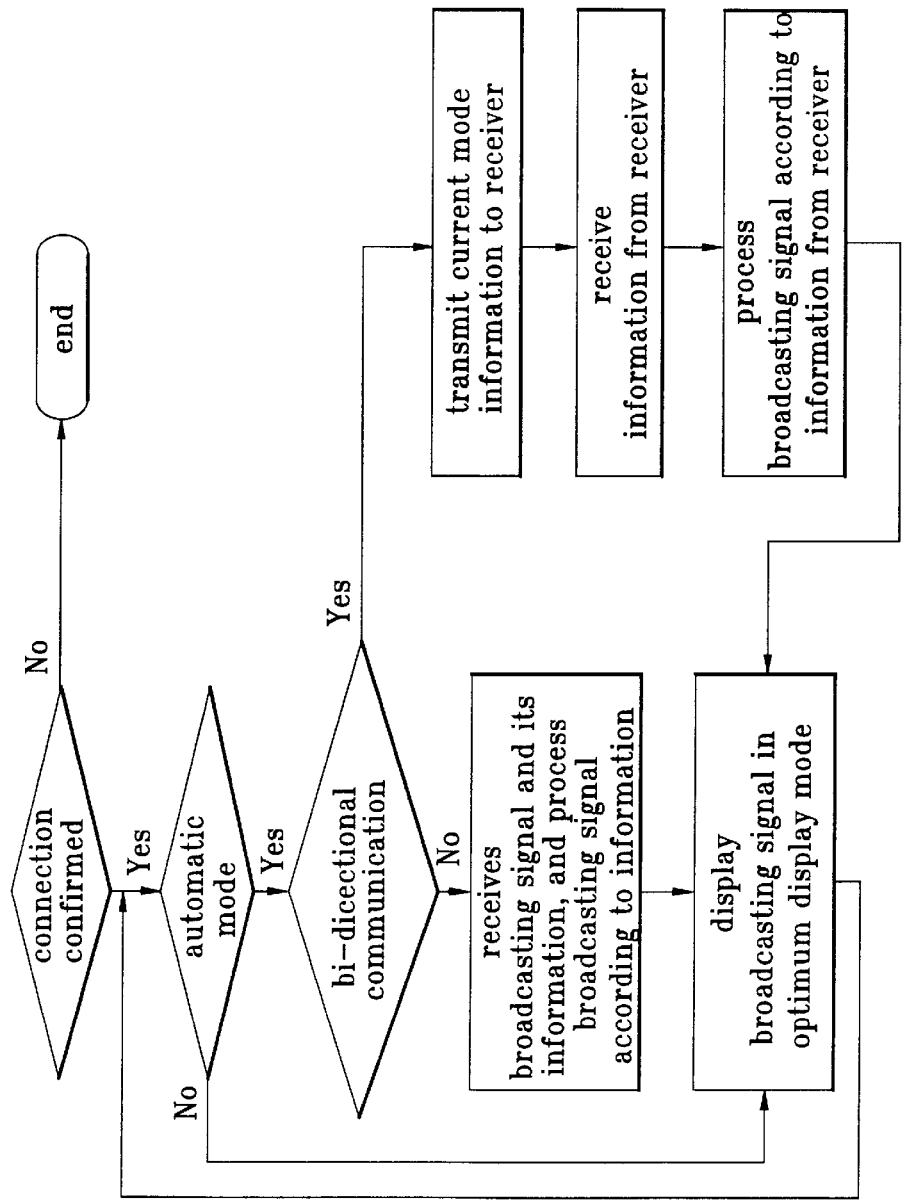
FIG. 5 is a flowchart of a digital display device operations according to the present invention.

FIG. 5 is a flowchart showing the operation of the display device 200. The display device 200 first confirms whether it is connected to the STP 100. If the display device is not connected to the STP 100, the operation terminates. Otherwise, if the display device 20 is connected to the STP 100, the display device 200 confirms whether its operation mode is in the automatic mode. If the operation mode is not in the automatic mode, the display device 200 displays the received broadcasting signal in a predetermined optimum display mode. On the other hand, if the operation mode is in the automatic mode, the display device 200 checks whether the connection with the STP 100 is bi-directional through the bi-directional communication line 310 or uni-directional through the transmission line 320.

If the transmission is uni-directional, the display device 200 receives the broadcasting signal from the STP 100 and extracts information on the broadcasting signal from the received broadcasting signal. Thereafter, the display device 200 determines the optimum display mode for displaying the received broadcasting signal using the extracted information and displays the received broadcasting signal in the optimum display mode. If the transmission is bi-directional, the display device 200 transmits information on its current display mode to the STP 100 through the bi-directional communication line 310. The display device 200 then receives broadcasting signal processed in accordance with the display mode from the STP 100 and information on the processed broadcasting signal. Thus, the display device 200 determines the optimum display mode using the information of the processed broadcasting signal and displays the processed broadcasting signal from the STP 100 in the optimum display mode.

Figure 6:
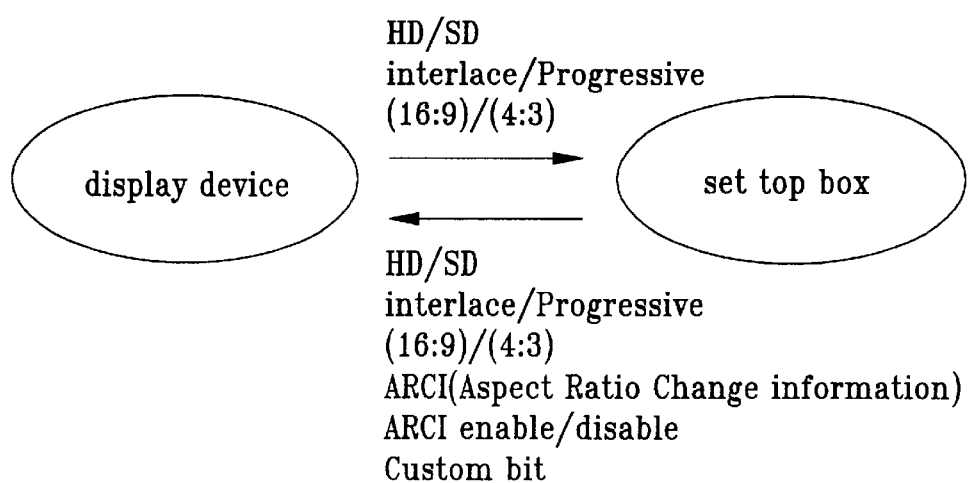
FIG. 6 shows the contents of information sent/received between a digital broadcasting receiver and a digital display device when a bi-directional communication is performed through a bi-directional communication line according to the present invention.

FIG. 6 shows an example contents of the information sent/received between the digital broadcasting receiver and the digital display device when a bi-directional communication is performed through the bi-directional communication line according to the present invention. Referring to FIG. 6, the display device 200 may transmit the resolution such as high definition (HD) or standard definition (SD), scanning type such as interlace or progressive, and aspect ratio such as 16:9 or 4:3, as the information on its current display mode. Similarly, the STP 100 may transmit to the display device 200 the resolution, scanning type, aspect ratio, aspect ratio change information (ARCI), enable or disable information of the ARCI, and custom information, as the information on the broadcasting signal processed using the information from the display device 200.

As described above, the display device 200 transmits information on its current display mode to the STP 100. Here, the display device may have a different number or types of display modes depending upon the manufacturer or purchaser. The STP 100 appropriately processes the input digital broadcasting signal through the video processor 140 using the information on the current display mode of the display device 200 and the information of the digital broadcasting signal received from the external source.

For example, if the display device 200 is set to a HD mode with an aspect ratio of 16:9 and the STP 100 receives a standard defintion digital broadcasting signal with an aspect ratio of 4:3, both devices can mutually exchange the information through the bi-directional communication line 310. Thus the display device 200 can inform the STP 100 that it is in the HD display mode with the aspect ratio of 16:9.

FIG. 7 shows a process of converting the format of the broadcasting signal for the above example when a bi-directional communication is performed between the digital broadcasting receiver and the digital display device according to the present invention. Particularly, the STP 100 receives the display mode from the display device 200 and up-converts the received broadcasting signal from the standard definition to the high definition. The STP 100 can also crop the up-converted broadcasting signal in accordance with the selection of the user as shown in FIG. 7. The STP 100 then transmits the up-converted high definition and cropped broadcasting signal, according to the user selection to the display device 200 together with the information of the broadcasting signal, i.e. the high definition and crop information.

Upon receiving the broadcasting signal and its information, the display device 200 searches from a lookup table for an optimum display mode that matches the information of the analog broadcasting signal transmitted from the STP 100. FIG. 8 is a lookup table showing the information of the broadcasting signal output from the digital broadcasting receiver and corresponding display modes of the display device. Referring to FIG. 8, the optimum display mode corresponding to the information from the STP 100, i.e. high definition with aspect ratio of 4:3 and crop information, is a normal mode. Accordingly, the display device 200 displays the transmitted broadcasting signal as shown in FIG. 7 in the normal mode.

The lookup table, as shown in FIG. 8, includes information on the signal output from the STP 100 and the display modes of the display device 200 corresponding to the information. Particularly, the lookup table includes information such as the resolution, aspect ratio, and ARCI of the broadcasting signal transmitted from the STP 100 to the display device 200; and includes information such as the resolution, aspect ratio, aspect ratio change mode for displaying the broadcasting signal in the display device 200. Here, the ARCI may be provided through the STP in accordance with a user selection.

In another example, if the STP 100 is connected to the display device 200 having a SD display mode with an aspect ratio of 16:9 and interlace scanning type, the display device 200 first transmits the current display mode information of the display device 200 to the STP 100. The digital STP 100 then appropriately processes the broadcasting signal received from an external source to match the current display mode information, i.e. standard definition with aspect ratio of 16:9 and interlace scanning. Assuming that the received broadcasting signal has an aspect ratio of 4:3 and is a high definition signal, the STP 100 down-converts the high definition broadcasting signal to the standard definition. Also, if the user selects a "wide" vision as the ARCI, the STP 100 processes the received broadcasting signal to the "wide" vision and transmits the "wide" SD broadcasting signal and its information (SD, interlace scanning type, and aspect ratio of 4:3) to the display device 200.

Thereafter, the digital display device 200 searches and determines the optimum display mode corresponding to the information of the received broadcasting signal using the lookup table. The input broadcasting signal is then displayed in the determined optimum display mode through the digital display device 200. In this example, the optimal display mode that corresponds to the standard definition, aspect ratio of 4:3 and "wide" vision would be the SD mode with aspect ratio of 16"9 and "wide" vision.

In the above embodiment, the STP 100 and the digital display device 200 may perform communication to exchange information through the bi-directional communication line 310 and use the transmission line 320 only for the transmission of the analog broadcasting signal.

Figure 9:
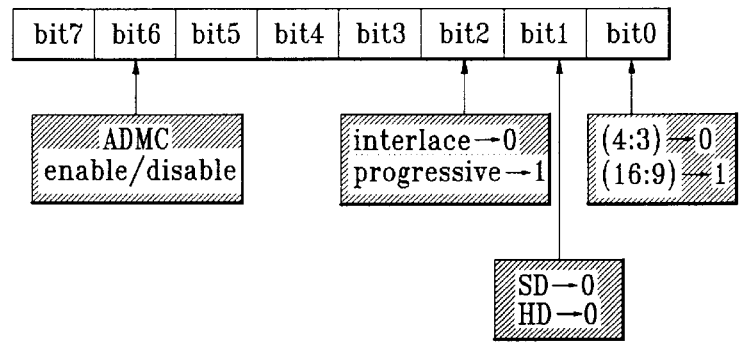
FIG. 9 shows a data field including information on a current display mode of a display device according to the present invention.

FIG. 9 is a data field showing the information on a current display mode of the display device 200. As shown in FIG.

9, the information on a current display mode of the display device 200 is a data field including bits for the aspect ratio, scanning type, resolution, and automatic display mode change. Here, the aspect ratio, the scanning type, the resolution, and the automatic display mode change can each be represented by one bit. Also, as described above, the aspect ratio may be either of 16:9 or 4:3, the scanning type may be either interlace or progressive, and the resolution may be either high definition or standard definition. Accordingly, the STP 100 may up-convert or down-convert the received broadcasting signal in accordance with a current display mode information.

Figure 10:
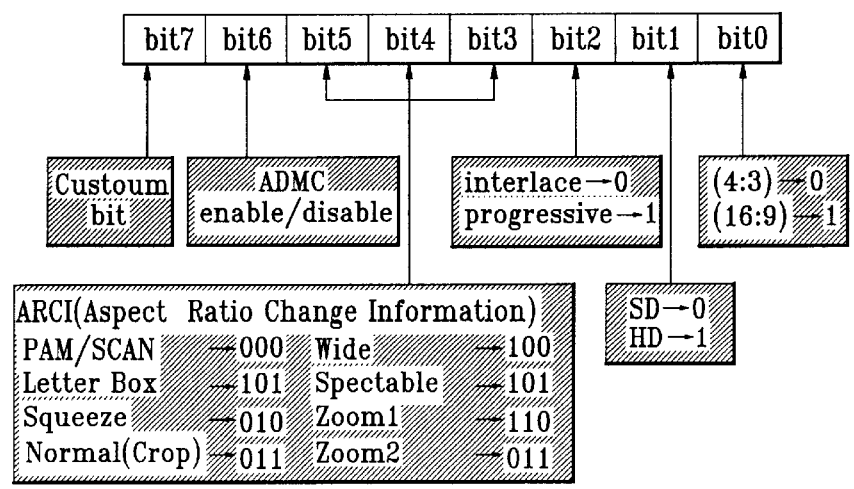
FIG. 10 shows a data field including information transmitted from a digital broadcasting receiver to a display device according to the present invention.

FIG. 10 is a data field showing the information transmitted from the STP 100 to the display device 200. As shown in FIG. 10, the data field may include the resolution, scanning type, aspect ratio, ARCI selected by a user, and custom information which is broadcasting signal processing information of the STP itself. Here, the ARCI (ARCI) may be one of pan/scan, letter box, crop, wide, spectacle, zooming (zoom1 and zoom2), normal, and squeeze. Also, the resolution, the scanning type, the aspect ratio, the enable/disable information of the ARCI, the custom information may each be represented by one bit while the ARCI is represented by three bits. For example, "000" represents pan/scan, "001" represents letter box, "010" represents squeeze, "011" represents normal or crop, "100" represents wide, "101" represents spectacle, "110" represents zoom1, and "111" represents zoom2.

Figure 11:
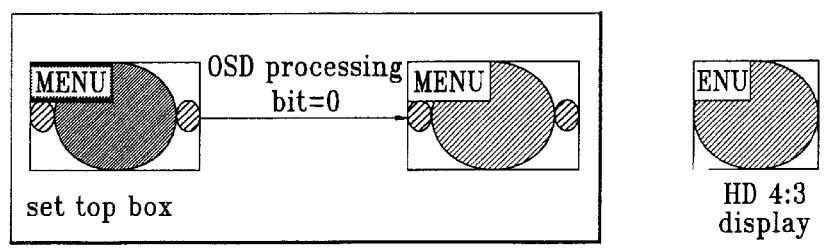
FIGS. 11 and 12 are examples defining a custom bit according to the present invention.
Figure 12:
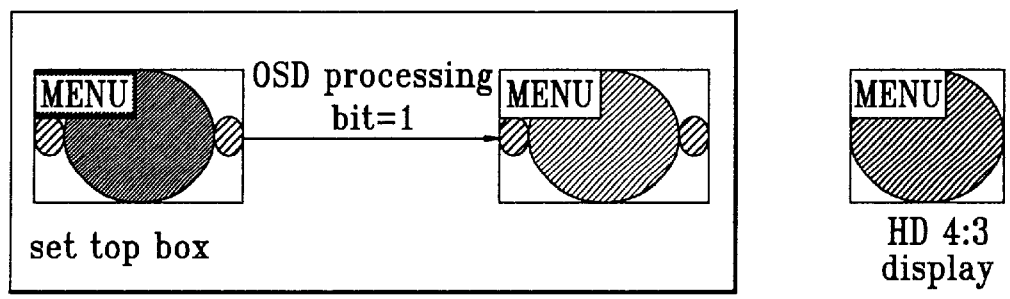

Moreover, the custom bit is an option of the manufacturer of the STP 100. FIGS. 11 and 12 show examples of defining the custom bit. For example, if a HD broadcasting signal with an aspect ratio of 16:9 is displayed through the display device having the HD mode with an aspect ratio of 4:3, the portions corresponding to the sides of the screen would be cut off as shown in FIG. 11. At this time, if on-screen characters are mixed with the broadcasting signal, the on-screen characters would also be cut off and not fully displayed on the screen. In the present invention, the STP 100 may down-sample the on-screen display region by half using the custom bit, and mix the down-sampled on-screen display region with the broadcasting signal. Accordingly, the down-sampled on-screen characters would be fully displayed even if the sides of the screen is cut off as shown in FIG. 12. Here, the signal processing of the STP 100 may be defined by the custom bit, and the custom bit may be transmitted to the display device 200.

Figure 13:
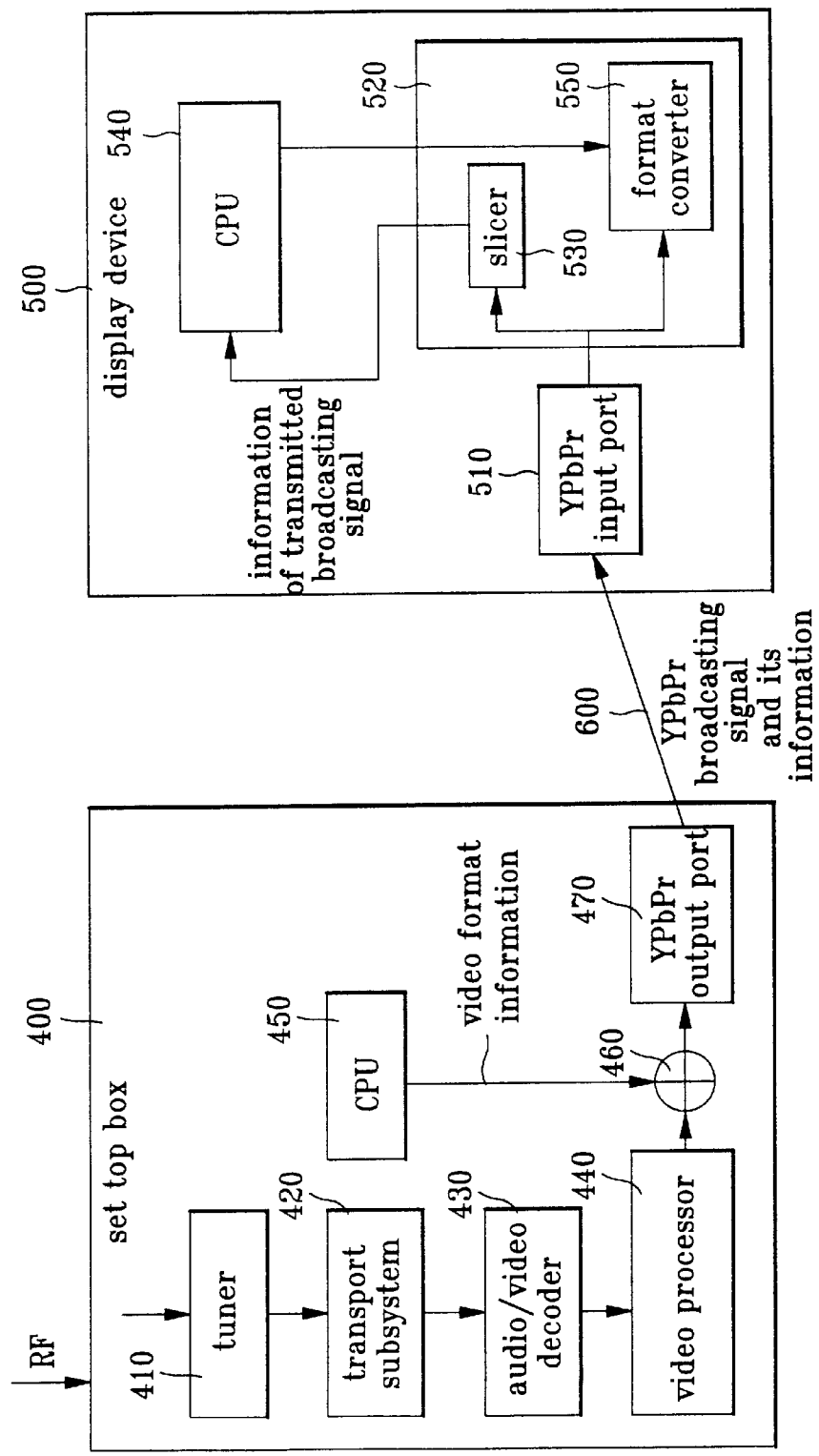
FIG. 13 is a block diagram showing a uni-directional transmission line of a broadcasting signal provided between a digital broadcasting receiver and a display device according to the present invention.

Thus far, the present invention has been described with reference to a bi-directional communication line between the digital broadcasting receiver and the display device. In another embodiment of the present invention, a uni-directional transmission line rather than the bi-direction communication line is provided between the STP 100 and the display device 200. FIG. 13 is a block diagram where a transmission line is provided between the STP and the display device according to the present invention.

Figure 14:
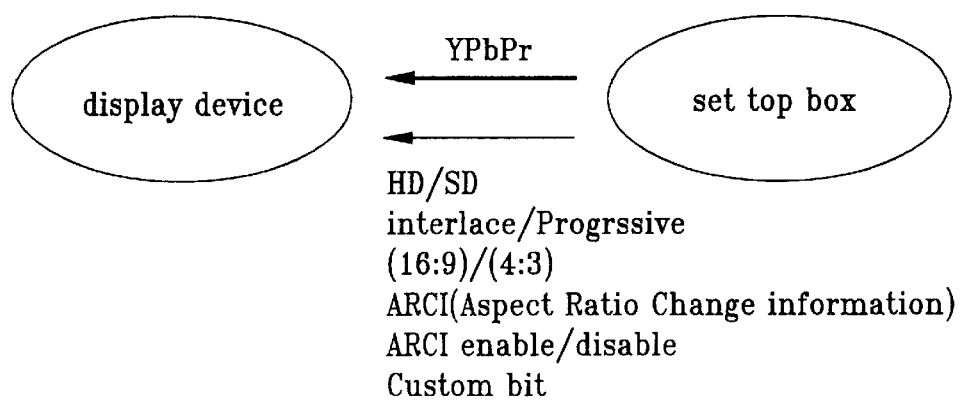
FIG. 14 shows the contents of information sent/received between a digital broadcasting receiver and a digital display device when uni-directional communication is performed through the transmission line according to the present invention.

Referring to FIG. 14, a STP 400 comprises a tuner 410 which tunes a digital radio frequency (RF) signal from an external source; a transport subsystem 420; an audio/video decoder 430; a video processor 440; a central processing unit (CPU) 450; an adder 460; and a YPbPr output port 470 which outputs a YPbPr signal, i.e. the analog broadcasting signal. The display device 500 comprises a YPbPr input port 510; a CPU 540 which determines an optimum display mode using information from the STP 400; and a video processor 520 including a slicer 530 and a format converter 550. As shown, the second embodiment of the present invention employs only a transmission line 600 for transmitting the broadcasting signal.

The basic operation of the STP 400 and the display device 500 is the same as described reference to FIG. 3. However, in the second embodiment, the STP 400 inserts information of the input broadcasting signal with the processed broadcasting signal for display through the adder 460. Thus, the processed broadcasting signal and its information is output to the display device 200. Similarly, in the display device, the slicer 530 extracts the information of the processed signal and determines an optimum display mode to display the received broadcast signal.

FIG. 14 shows an example contents of the information sent/received between the digital broadcasting receiver and the digital display device when a uni-directional communication is performed through the transmission line according to the present invention. The information may include the aspect ratio, scanning type, resolution, ARCI, enable/disable information of the ARCI, and custom signal processing information. Accordingly, the STP 400 transmits the input broadcasting signal with the information on the broadcasting signal, as shown in FIG. 14, to the display device 500 through the transmission line 600.

Thereafter, the display device 500 extracts the information from the broadcasting signal and determines the optimum display mode from the lookup table of FIG. 8 using the extracted information. The display device 500 then displays the broadcasting signal from the STP 400 in the optimum display mode.

For example, if the display device 500 having a current display mode of the standard definition, aspect ratio of 4:3, and interlace scanning type, receives from the STP 400 a HD broadcasting signal with aspect ratio of 4:3 and progressive scanning type, the STP 400 confirms from a user the ARCI. If the user desires to view the broadcasting signal with the spectacle aspect ratio, the STP 400 transmits to the display device 500 information including high definition, aspect ratio of 4:3, progressive scanning type, spectacle, aspect ratio change enable information, and custom disable information together with the YPbPr broadcasting signal.

The display device 500 receives the information and searches to determine the optimum display mode among the display modes that can be supported by the display device as shown in the lookup table of FIG. 8 using the information. In the present example, the display device 500 down-converts the high definition broadcasting signal from the STP 400 to standard definition, and converts the progressive scanning type into interlace scanning type. Also, the display device 500 searches and determines from the lookup table of FIG. 8 for its own optimum display mode corresponding to the spectacle information in order to display the transmitted broadcasting signal in the form of spectacle. In this case, the optimum display mode corresponds to a SD mode with aspect ratio of 16:9 and the spectacle display.

Furthermore, as in the first embodiment, the data field of the information included in the broadcasting signal output from the STP 400 to the display device 500 includes one bit representing the resolution, one bit representing the scanning type, one bit representing the aspect ratio, three bits representing the ARCI selected by the user, one bit representing the enable/disable information of the ARCI, and one bit representing the custom information. Also, the aspect ratio may be either of 16:9 or 4:3, the scanning type may be either interlace or progressive, and the resolution may be either high definition or standard definition.

Moreover, the STP 400 can process the received broadcasting signal in accordance with the ARCI selected by the user before transmitting the broadcasting signal to the digital display device 500. The processed broadcasting signal and the information on the broadcasting signal are then transmitted to the display device 500. Similarly, to the first embodiment, the ARCI may be one of pan/scan, letter box, crop, wide, spectacle, zooming (zoom1 and zoom2), normal, and squeeze.

In another example, the STP 400 may up-convert the received broadcasting signal in standard definition to a high definition broadcasting signal in accordance with the selection of the user, and transmit the up-converted broadcasting signal and its information, i.e. the high definition, aspect ratio of 16:9, and cropped signal, to the display device 500. In such case, the display device 500 determines the normal mode as the optimum display mode according to the information using the lookup table of FIG. 8.

As described above, the method of displaying a digital broadcasting signal using a digital broadcasting receiver and a digital display device according to the present invention has the following effects. First, an optimum display mode that can be supported by a display device can automatically be searched since a digital broadcasting receiver and the display device can share information on the broadcasting signal received from an external source. Accordingly, the broadcasting signal can be displayed in the optimum display mode through the display device. Second, if the present method is implemented to an automatic wide television receiver, a complicated algorithm is not required for detecting the aspect ratio of the broadcasting signal received from an external source.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of displaying a broadcasting signal using a digital broadcasting receiver and a display device, comprising:

(a) connecting the digital broadcasting receiver to the display device with a bi-directional communication line;

(b) transmitting, from the display device to the digital broadcasting receiver, the information on the display mode of the display device through the bi-directional communication line;

(c) processing, at the digital broadcasting receiver, an input broadcasting signal in accordance with the display mode of the display device and generating information regarding the processed broadcasting signal;

(d) transmitting, from the digital broadcasting receiver to the display device, the information regarding the processed broadcasting signal through the bi-directional communication line;

(e) transmitting, from the digital broadcasting receiver to the display device, the processed broadcasting signal; and (f) determining, at the display device, an optimum display mode using the information regarding the processed broadcasting signal and displaying the processed broadcasting signal in the optimum display mode.

2. A method of claim 1, wherein in (b), the display mode includes information on a resolution, scanning type, and aspect ratio.

3. A method of claim 1, wherein in (c), the information regarding the processed broadcasting signal includes the resolution, scanning type, aspect ratio, aspect ratio change information, enable or disable information of the aspect ratio change information, and custom information.

4. A method of claim 1, wherein the information on the display mode is a data field including one bit representing an aspect ratio, one bit representing a scanning type, one bit representing a resolution, and one bit representing an automatic display mode change.

5. A method of claim 4, wherein the aspect ratio is either of 16:9 or 4:3, the scanning type is either interlace or progressive, and the resolution is either high definition or standard definition.

6. A method of claim 1, wherein the information regarding the processed broadcasting signal is a data field including one bit representing an aspect ratio, one bit representing a scanning type, one bit representing a resolution, one bit representing an automatic display mode change, one bit representing a custom information, three bits representing an aspect ratio change information, and one bit representing enable/disable information of the aspect ratio change.

7. A method of claim 6, wherein the aspect ratio is either of 16:9 or 4:3; the scanning type is either interlace or progressive; the resolution is either high definition or standard definition; the aspect ratio change information is one of pan/scan, letter box, crop, wide, spectacle, zooming, normal, and squeeze; and the custom bit is a processing information of the processed broadcasting signal.

8. A method of claim 1, wherein in (f), determining the optimum mode by searching from a lookup table for a display mode that matches the information of the processed broadcasting signal.

9. A method of claim 8, wherein the lockup table includes information on a plurality of display modes transmitted from the digital broadcasting receiver to the display device and corresponding display modes of the display device.

10. A method of claim 9, wherein the information on the plurality of display modes includes resolution, aspect ratio, and aspect ratio change information.

11. A method of claim 1, wherein (e) comprises:

connecting the digital broadcasting receiver to the display device with a transmission line; and transmitting, from the digital broadcasting receiver to the display device, the processed broadcasting signal through the transmission line.

12. A method of displaying a broadcasting signal using a digital broadcasting receiver and a display device, comprising:

(a) connecting the digital broadcasting receiver to the display device with a transmission line;

(b) processing, at the digital broadcasting receiver, input broadcasting signal and inserting information regarding the processed broadcasting signal onto the processed broadcasting signal;

(c) transmitting, from the digital broadcasting receiver to the display device, the processed broadcasting signal with the inserted information regarding the processed broadcasting signal through the transmission line;

(d) extracting, at the display device, the information regarding the processed broadcasting signal and determining an optimum display mode using the extracted information regarding the processed broadcasting signal; and (e) displaying the processed broadcasting signal in the optimum display mode.

13. A method of claim 12, wherein in (b), the processed broadcasting signal is an analog broadcasting signal and inserting the information on the analog broadcasting signal among the scanning lines of the analog broadcasting signal.

14. A method of claim 12, wherein in (b), the information regarding the processed broadcasting signal includes an aspect ratio, a scanning type, a resolution, an aspect ratio change information, an enable/disable information of the aspect ratio change information, and a custom information.

15. A method of claim 12, wherein in (b), the information regarding the processed broadcasting signal is a data field including one bit representing an aspect ratio, one bit representing a scanning type, one bit representing a resolution, one bit representing an automatic display mode change, one bit representing a custom information, three bits representing an aspect ratio change information, and one bit representing enable/disable information of the aspect ratio change.

16. A method of claim 12, wherein in (d), determining the optimum mode by searching from a lookup table for a display mode that matches the information of the processed broadcasting signal.

17. A method of claim 16, wherein the lookup table includes information on a plurality of display modes transmitted from the digital broadcasting receiver to the display device and corresponding display modes of the display device.

18. A method of displaying a broadcasting signal using a digital broadcasting receiver and a display device, comprising:

(a) determining whether the digital broadcasting receiver is connected to the display device;

(b) determining whether the connection is uni-directional or bi-directional if the digital broadcasting receiver is connected to the display device;

(c) processing, at the digital broadcasting receiver, input broadcasting signal and inserting information regarding the processed broadcasting signal to the processed broadcasting signal, if the connection is uni-directional and transmitting to the display device the processed broadcasting signal with the inserted information regarding the processed broadcasting signal;

(d) extracting, at the display device, the information regarding the processed broadcasting signal and determining an optimum display mode using the extracted information regarding the processed broadcasting signal, if the connection is uni-directional;

(e) transmitting, from the display device to the digital broadcasting receiver, the information on the display mode of the display device if the connection is bi-directional;

(f) processing, at the digital broadcasting receiver, an input broadcasting signal in accordance with the display mode of the display device, generating information regarding the processed broadcasting signal, and transmitting to the display device the processed broadcasting signal with the information regarding the processed broadcasting signal, if the connection is bi-directional;

(g) determining, at the display device, an optimum display mode using the information regarding the processed broadcasting signal, if the connection is bi-directional; and (h) displaying the processed broadcasting signal in the optimum display mode.

19. A method of claim 18, wherein determining the optimum mode by searching from a lookup table for a display mode that matches the information of the processed broadcasting signal.

* * * * *